(12) United States Patent
Jeong

(10) Patent No.: US 12,286,973 B2
(45) Date of Patent: Apr. 29, 2025

(54) ELECTRIC WATER PUMP

(71) Applicants: HYUNDAI MOTOR COMPANY, Seoul (KR); KIA CORPORATION, Seoul (KR)

(72) Inventor: Seong-Bin Jeong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/624,950

(22) Filed: Apr. 2, 2024

(65) Prior Publication Data
US 2025/0084849 A1 Mar. 13, 2025

(30) Foreign Application Priority Data
Sep. 11, 2023 (KR) .................. 10-2023-0120238

(51) Int. Cl.
| | |
|---|---|
| F04D 1/00 | (2006.01) |
| F04D 13/06 | (2006.01) |
| F04D 29/42 | (2006.01) |
| H02K 5/16 | (2006.01) |
| H02K 5/167 | (2006.01) |
| H02K 5/20 | (2006.01) |
| H02K 7/08 | (2006.01) |
| H02K 9/19 | (2006.01) |
| H02K 21/24 | (2006.01) |

(52) U.S. Cl.
CPC .............. *F04D 13/06* (2013.01); *F04D 1/00* (2013.01); *F04D 29/4293* (2013.01); *H02K 5/1672* (2013.01); *H02K 5/203* (2021.01); *H02K 7/083* (2013.01); *H02K 9/19* (2013.01); *H02K 21/24* (2013.01)

(58) Field of Classification Search
CPC ............ F04D 13/06; F04D 1/00; F04D 29/22; H02K 5/1672; H02K 7/083; H02K 21/24
See application file for complete search history.

(56) References Cited

FOREIGN PATENT DOCUMENTS

| CN | 105298865 A | * | 2/2016 | ........... F04D 29/663 |
| CN | 114151349 A | * | 3/2022 | ............... F04D 1/00 |
| CN | 114922825 A | * | 8/2022 | ........... F04D 29/669 |

OTHER PUBLICATIONS

English translation of CN114922825 by PEsE Jul. 22, 2024.*
Englsih translation of CN 105298865 by PE2E Jul. 22, 2024.*
English translation of CN 114151349 by PE2E Jul. 22, 2024.*

* cited by examiner

*Primary Examiner* — Deming Wan
(74) *Attorney, Agent, or Firm* — Lempia Summerfield Katz LLC

(57) ABSTRACT

An electric water pump includes: a housing with a cooling water inlet and a cooling water outlet; a stator assembly provided inside the housing and having stator coils on upper and lower surfaces thereof, respectively; a rotor assembly including a rotary shaft rotatably supported on the housing, a first magnetic body provided at an upper portion of the stator assembly, and a second magnetic body provided at a lower portion of the stator assembly; and an impeller provided to rotate integrally with the rotary shaft of the rotor assembly.

5 Claims, 10 Drawing Sheets

ELECTRIC WATER PUMP

CROSS-REFERENCE TO RELATED APPLICATION

This application claims priority to and the benefit of Korean Patent Application No. 10-2023-0120238 filed in the Korean Intellectual Property Office on Sep. 11, 2023, the entire contents of which are incorporated herein by reference.

BACKGROUND

(a) Field of the Disclosure

The present disclosure relates to an electric water pump.

(b) Description of the Related Art

In general, an air conditioning system applied to eco-friendly vehicles is commonly called a heat pump system.

The heat pump system is equipped with an electric water pump that pumps cooling water. The electric water pump pumps cooling water while an impeller is rotated by power generated by a driving motor operated by electric energy.

In order to ensure insulation of coils of the driving motor against the cooling water and to prevent the coils of the driving motor from corroding due to the cooling water, a waterproof cover is provided inside the electric water pump. The waterproof cover prevents the cooling water from being introduced into the coils of the driving motor. The waterproof cover interrupts the cooling water from being introduced between coils wound on a stator of the driving motor and a rotor with a magnetic body.

However, when the waterproof cover is provided between the stator and the rotor of the driving motor, an air gap between the stator and the rotor increases. As a result, there is a problem in that the performance of the electric water pump deteriorates.

Further, an axial size and a radial size of the electric water pump increase due to the presence of the waterproof cover. There is a problem in that it is difficult to secure a package space in a limited space inside the vehicle.

The above information disclosed in this Background section is only to enhance understanding of the background of the disclosure. Therefore, the Background section may contain information that does not form the prior art that is already known to a person of ordinary skill in the art.

SUMMARY

The present disclosure has been made in an effort to provide an electric water pump in which a size of the electric water pump is reduced to facilitate packaging in a vehicle.

An embodiment of the present disclosure provides an electric water pump that may include a housing with a cooling water inlet and a cooling water outlet and that may include a stator assembly provided inside the housing. The stator assembly may have stator coils disposed or formed on upper and lower surfaces thereof, respectively. The electric water pump may also include a rotor assembly having a rotary shaft rotatably supported on the housing, a first magnetic body provided at an upper portion of the stator assembly, and a second magnetic body provided at a lower portion of the stator assembly. The electric water pump may also include an impeller provided to rotate integrally with the rotary shaft of the rotor assembly.

In some embodiments, the housing may include an upper housing and a lower housing provided below the upper housing.

In some embodiments, the cooling water inlet may be formed or disposed at an upper center of the upper housing and the cooling water outlet may be formed or disposed on a side of the upper housing.

In some embodiments, the electric water pump may further include an upper bearing provided in an upper bearing support formed or disposed below the cooling water inlet of the upper housing. The electric water pump may also include a lower bearing provided in a lower bearing support that is formed or disposed at a lower center of the lower housing. The rotary shaft may be rotatably supported through the upper bearing and the lower bearing.

Another embodiment of the present disclosure provides an electric water pump that may include a housing having a cooling water inlet that is formed or disposed at an upper center and a cooling water outlet that is formed or disposed on a side of the housing. The electric water pump may also include a waterproof cover that partitions the inside of the housing into a wet area and a dry area. The electric water pump may also include a stator assembly provided inside the housing and having stator coils formed on upper and lower surfaces thereof, respectively. The electric water pump may also include a rotor assembly having a first magnetic body provided to correspond to the upper surface of the stator assembly, a second magnetic body provided to correspond to the lower surface of the stator assembly, and a rotary shaft rotatably supported on the housing. The electric water pump may also include an impeller provided to rotate integrally with the rotary shaft of the rotor assembly.

In some embodiments, the wet area may be formed or disposed at an upper portion inside the housing, and the dry area may be formed at a lower portion inside the housing.

In some embodiments, the impeller and the first magnetic body may be positioned in the wet area and the stator assembly and the second magnetic body may be positioned in the dry area.

In some embodiments, the housing may include an upper housing and a lower housing provided below the upper housing.

In some embodiments, the cooling water inlet may be formed or disposed at an upper center of the upper housing and the cooling water outlet may be formed or disposed on a side of the upper housing.

In some embodiments, the rotary shaft may be rotatably provided in the upper housing, the waterproof cover, and the lower housing.

In some embodiments, the electric water pump may further include an upper bearing provided in an upper bearing support that is formed or disposed below the cooling water inlet of the upper housing. The electric water pump may also include an intermediate bearing provided at a center hole that is formed or disposed in the waterproof cover. The electric water pump may also include a lower bearing provided in a lower bearing support that is formed or disposed at a lower center of the lower housing. The rotary shaft may be rotatably supported through the upper bearing, the intermediate bearing, and the lower bearing.

According to embodiments of the present disclosure, an axial flux motor is applied to an electric water pump to reduce an axial size of the electric water pump.

In addition, a size of an air gap between a stator assembly and a rotor assembly is minimized to increase an output of a driving motor.

An effect that can be obtained or predicted by the embodiments of the present disclosure is directly or implicitly disclosed in the below detailed description of the embodiments of the present disclosure. Various effects, which may become apparent according to the embodiments of the present disclosure. are disclosed in the detailed description below.

BRIEF DESCRIPTION OF THE DRAWINGS

The accompanying drawings are for the purpose of describing embodiments of the present disclosure. Therefore, the technical spirit of the present disclosure should not be construed as being limited to the accompanying drawings.

Figure 1:
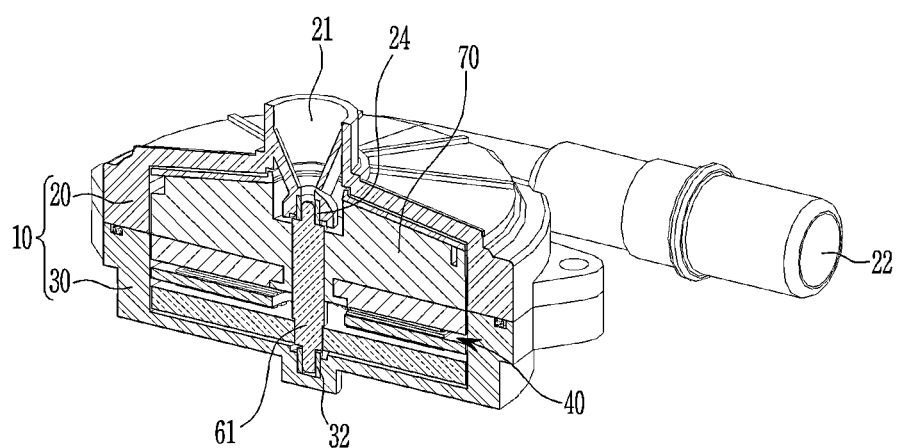
FIG. 1 is a cross-sectional perspective view illustrating a configuration of an electric water pump according to an embodiment.

The drawings referenced above are not drawn or illustrated to scale and thus should be understood as presenting a somewhat brief expression of various features that illustrate the basic principles of the present disclosure. For example, the specific design features of the present disclosure, including specific dimensions, directions, positions, and shapes, will be partially determined by specific intended applications and use environments.

DETAILED DESCRIPTION OF THE EMBODIMENTS

The terms used here are only for describing specific embodiments and are not intended to limit the present disclosure. As used herein, the singular forms are also intended to include plural forms, unless they are explicitly differently indicated by context. It should be appreciated that, when terms such as "have", "having", "comprise", "comprising", "include", and/or "including" are used in this specification, the terms are intended to designate the existence of mentioned features, integers, steps, operations, constituent elements, and/or components. Such terms do not exclude the existence or addition of one or more other features, integers, operations, constituent elements, and components, or groups thereof. As used herein, the term "and/or" includes any one or all combinations of the items which are associated and listed.

By referring to the accompanying drawings, embodiments of the present disclosure are described in detail so that those of ordinary skill in the art in a technical field to which the present disclosure pertains can apply same. However, the present disclosure can be realized in various different forms and is not limited to the embodiments described herein.

Parts irrelevant to the description have been omitted to clearly describe the present disclosure. The same or similar elements are designated by the same reference numerals throughout the specification. When a component, device, element, or the like of the present disclosure is described as having a purpose or performing an operation, function, or the like, the component, device, or element should be considered herein as being "configured to" meet that purpose or perform that operation or function.

Further, since the size and thickness of each component illustrated in the drawings are arbitrarily represented for convenience in explanation, the present disclosure is not particularly limited to the illustrated size and thickness of each component. In some instances, the thickness may be enlarged and illustrated in order to clearly express various parts and areas.

Suffixes such as "module" and/or "unit" for components used in the following description are given or mixed only to simplify preparation of the present disclosure and do not have their own distinguished meanings or roles.

Further, in describing a disclosed embodiment, a detailed description of related known technologies has been omitted where it has been determined that the detailed description would have made the gist of the embodiments of the present disclosure unclear.

Further, the accompanying drawings are provided for helping to more readily understand embodiments disclosed in the present specification. The technical spirit disclosed in the present specification is not limited by the accompanying drawings. It should be appreciated that the present disclosure includes all of the modifications, equivalent matters, and substitutes included in the spirit and the technical scope of the present disclosure.

It should be understood that, when a component is described as being "connected to", "contacts", or "accesses" another component, the component may be directly connected to, in contact with, or access the other component or a third component may be present therebetween.

In contrast, when a component is described as being "directly connected to", "directly contacting", or "directly accesses" another component, it should be understood that no element is present between the element and the other element.

Hereinafter, an electric water pump according to an embodiment is described in detail with reference to the accompanying drawings.

FIG. 1 is a cross-sectional perspective view illustrating a configuration of an electric water pump according to an embodiment. In addition, FIG. 2 is an exploded perspective view illustrating the configuration of the electric water pump of FIG. 1 according to an embodiment.

Figure 2:
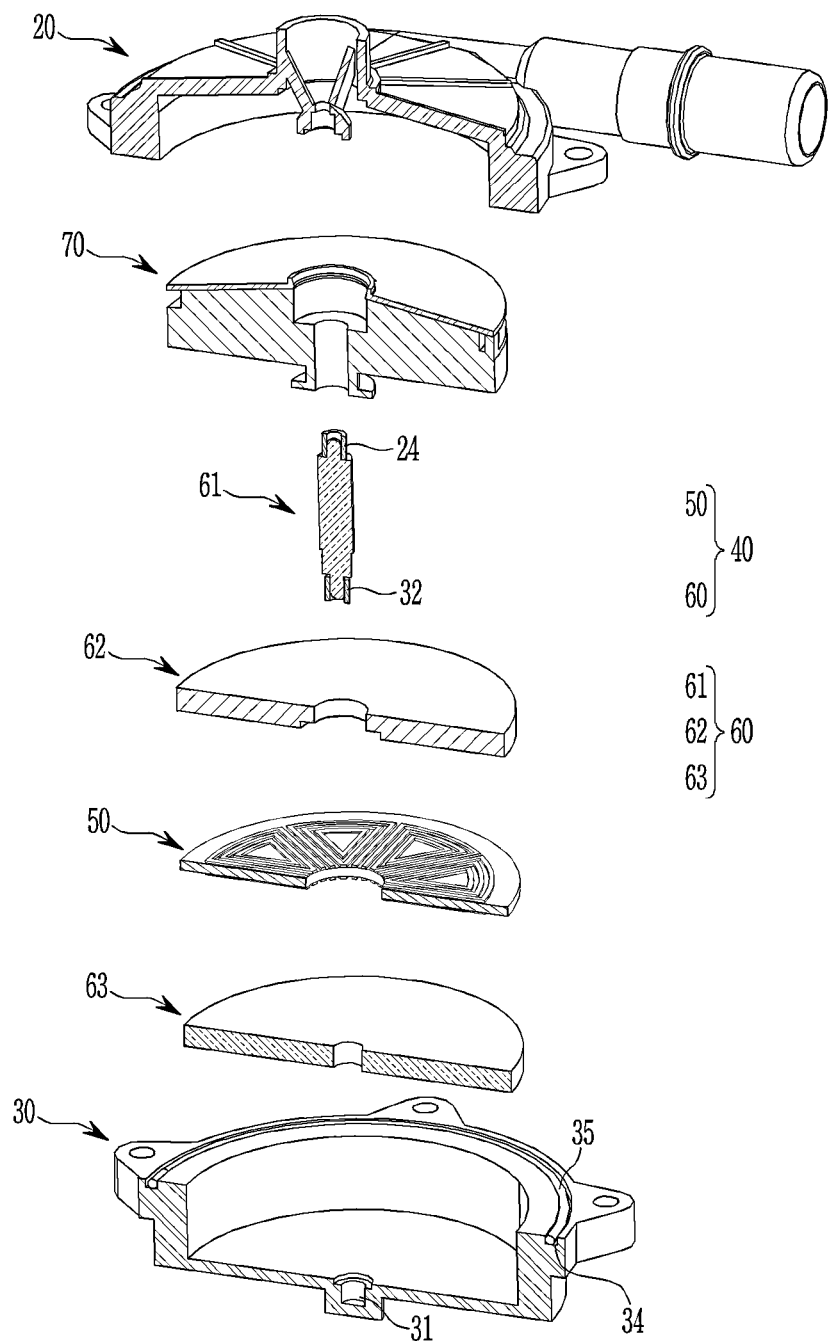
FIG. 2 is an exploded perspective view illustrating a configuration of an electric water pump according to an embodiment.

As illustrated in FIGS. 1 and 2, the electric water pump according to an embodiment may include a housing 10 with a cooling water inlet 21 and a cooling water outlet 22, an impeller 70 provided inside the housing 10, and a driving motor 40 provided inside the housing 10.

The housing 10 may include an upper housing 20 and a lower housing 30. The impeller 70 and the driving motor 50 including the stator assembly 50 and the rotor assembly 60 may be provided in an inner space, i.e., the inside of the housing 10, formed by coupling the upper housing 20 and the lower housing 30.

Figure 3:
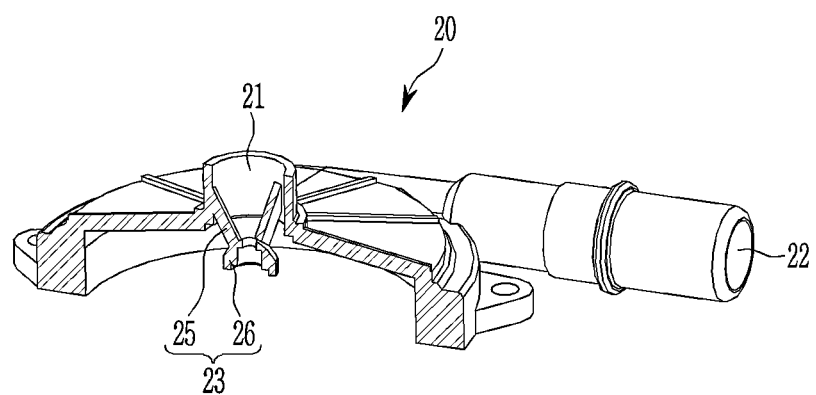
FIG. 3 is a perspective view illustrating a configuration of an upper housing of an electric water pump according to an embodiment.

Referring to FIG. 3, the upper housing 20 is formed in an approximately hollow cylindrical shape and a lower portion is opened. A cooling water inlet 21 through which cooling water is introduced may be formed or disposed at an upper center of the upper housing 20. A cooling water outlet 22 through which the cooling water is discharged may be formed or disposed on a side of the upper housing 20.

An upper bearing support 23 may be formed or disposed below the cooling water inlet 21 of the upper housing 20. The upper bearing support 23 may include at least one support rod 25 extended from an inner side of the cooling water inlet 21. A support boss 26 may be formed or disposed at an end of the support rod 25. The support boss 26 may be formed in the approximately hollow cylindrical shape and upper and lower portions of the support boss 26 may be opened. An upper bearing 24 is provided inside the support boss 26. The upper bearing 24 rotatably supports an upper portion of a rotary shaft 61. In other words, the upper portion of the rotary shaft 61 is rotatably provided in the upper housing through the upper bearing 24.

Figure 4:
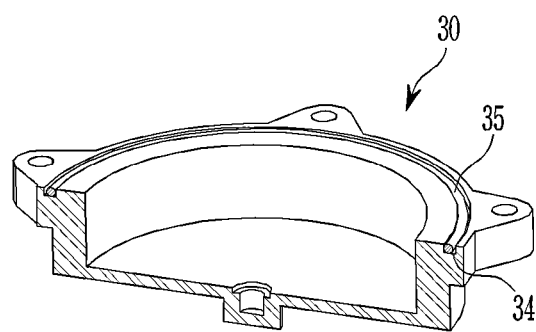
FIG. 4 is a perspective view illustrating a configuration of a lower housing of an electric water pump according to an embodiment.

Referring to FIG. 4, the lower housing 30 is formed in the approximately hollow cylindrical shape and an upper portion of the lower housing 30 is opened. The lower bearing support 31 may be formed or disposed at the lower center of the lower housing 30. The lower bearing support 31 may be formed or disposed to be concave on the bottom surface of the lower housing 30. The lower bearing 32 is provided in the lower bearing support 31. The lower bearing 32 rotatably supports a lower portion of the rotary shaft 61. In other words, the lower portion of the rotary shaft 61 is rotatably provided in the lower housing 30 through the upper bearing 32.

A first sealing groove 34 is formed or disposed radially outward on an axial facing surface of the lower housing 30 in a circumferential direction. A lower sealing member 35 is provided in the first sealing groove 34. When the upper housing 20 and the lower housing 30 are coupled or joined, cooling water may be prevented from leaking to the outside of the housing 10 by the lower sealing member 35.

Referring back to FIGS. 1 and 2, the driving motor 40 includes the stator assembly 50 and the rotor assembly 60. The stator assembly 50 and the rotor assembly 60 generate power for actuating the impeller 70 of the rotor assembly 60 by an electromagnetic action.

Figure 5:
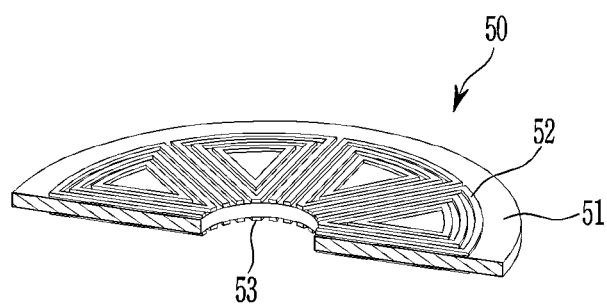
FIG. 5 is a perspective view illustrating a configuration of a rotor assembly of an electric water pump according to an embodiment.

Stator coils 52 and 53 may be formed or disposed on an upper surface and a lower surface of the stator assembly 50, respectively (see FIG. 5). To this end, the stator assembly 50 may include a stator body 51, an upper stator coil 52 formed on an upper surface of the stator body 51, and a lower stator coil 53 formed on a lower surface of the stator body 51. The stator body 51 is a printed circuit board (PCB). The upper stator coil 52 is wound on the upper surface of the stator body 51 with a very thin thickness and the lower stator coil 53 is wound on the lower surface of the stator body 51 with the very thin thickness. In other words, the stator assembly 50 may be implemented as a kind of PCB stator form in which the stator coils 52 and 53 are formed on the upper surface and the lower surface of the stator body 51, respectively.

The rotor assembly 60 may include a rotary shaft 61 and may include a first magnetic body 62 and a second magnetic body 63 provided at the upper portion and the lower portion of the stator assembly 50, respectively. The first magnetic body 62 and the second magnetic body 63 may be permanent magnets. The first magnetic body 62 and the second magnetic body 63 may be formed or provided in a disk shape with a thin thickness.

The rotary shaft 61 may be provided to penetrate each of the impeller 70, the first magnetic body 62, the stator assembly 50, and the second magnetic body 63 sequentially disposed in the upper and lower directions.

According to an embodiment, the driving motor 40 is implemented as an axial flux motor (AFM) having the first and second magnetic bodies 63 provided at the upper and lower portions of the stator assembly 50, respectively. The axial flux motor, as a motor in which a magnetic flux generated from a magnetic body of the rotor heads to the axial direction, has higher torque and higher efficiency than a radial flux motor (RFM) in which the magnetic flux heads to the radial direction. Further, the axial flux motor may be readily modularized and may obtain an effect of being capable of reducing a volume of the motor compared to the radial flux motor.

Figure 6:
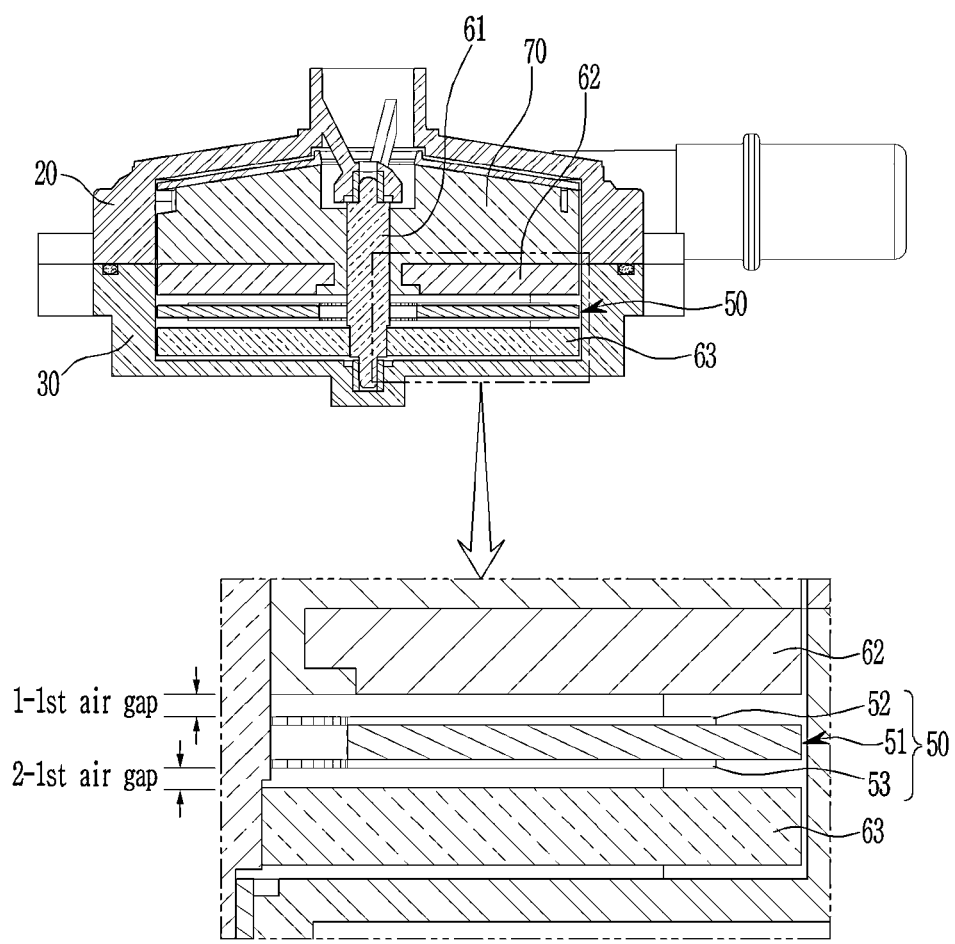
FIG. 6 is a cross-sectional view illustrating a configuration of an electric water pump according to an embodiment.

Referring to FIG. 6, the upper surface of the stator assembly 50 and the lower surface of the first magnetic body 62 are spaced apart from each other at a predetermined interval to form a $1\text{-}1^{st}$ air gap. The lower surface of the stator assembly 50 and the upper surface of the second magnetic body 63 are spaced apart from each other at a predetermined interval to form a $2\text{-}1^{st}$ air gap. In the case of the axial flux motor, since the sizes of the $1\text{-}1^{st}$ air gap between the upper surface of the stator assembly 50 and the first magnetic body 62, and the $2\text{-}1^{st}$ air gap between the lower surface of the stator assembly 50 and the second magnetic body 63 may be minimized, the output of the driving motor 40 may be increased.

According to an embodiment, the axial flux motor is applied to the electric water pump to minimize an axial size of the electric water pump. Further, the magnetic bodies 62 and 63 are disposed at the upper and lower portions of the stator assembly 50, respectively, to increase the torque of the driving motor 40 in a narrow space within the housing 10.

As described above, the rotary shaft 61 is rotatably supported on the housing 10. In other words, the rotary shaft 61 is rotatably supported on the housing 10 through the upper bearing 24 provided in the upper bearing support 23 of the upper housing 20 and through the lower bearing 32 provided in the lower bearing support 31 of the lower housing 30.

The impeller 70 is provided on the rotary shaft 61. The impeller 70 is provided to rotate integrally with the rotary shaft 61. The impeller 70 pumps the cooling water that is introduced through the cooling water inlet 21 formed in the housing 10. The cooling water pumped by the impeller 70 is discharged to the outside through the cooling water outlet 22.

According to an embodiment, the driving motor 40, which is the axial flux motor, is applied to the inside of the electric water pump to minimize the axial size of the electric water pump. In addition, the size of the air gap of the driving motor 40, which is the axial flux motor, is minimized to enhance the output of the driving motor 40.

An electric water pump according to another embodiment is described in detail with reference to the accompanying drawings. A detailed description of the same configuration as the electric water pump described with reference to FIGS. 1-6 above has been omitted.

Figure 7:
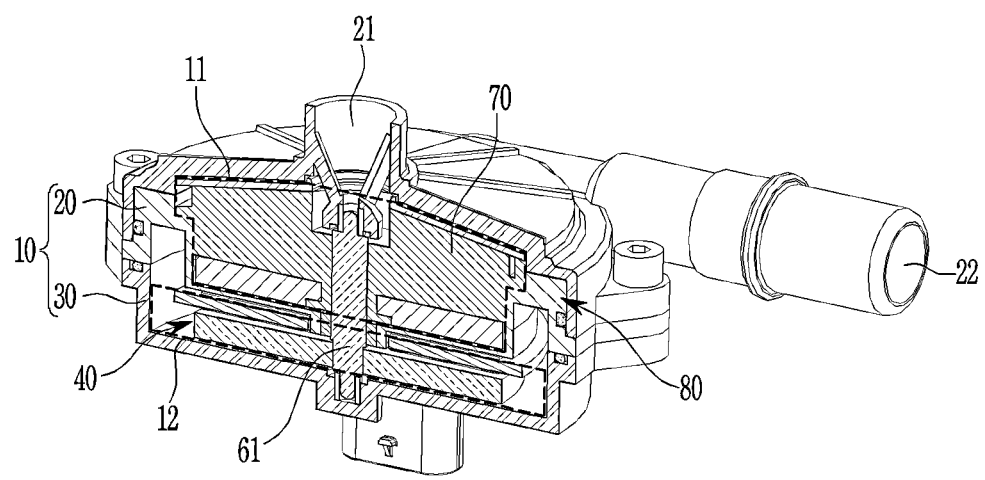
FIG. 7 is a cross-sectional perspective view illustrating a configuration of an electric water pump according to another embodiment.

FIG. 7 is a cross-sectional perspective view illustrating a configuration of an electric water pump according to another embodiment. In addition, FIG. 8 is an exploded perspective view illustrating a configuration of the electric water pump of FIG. 7 according to another embodiment.

Figure 8:
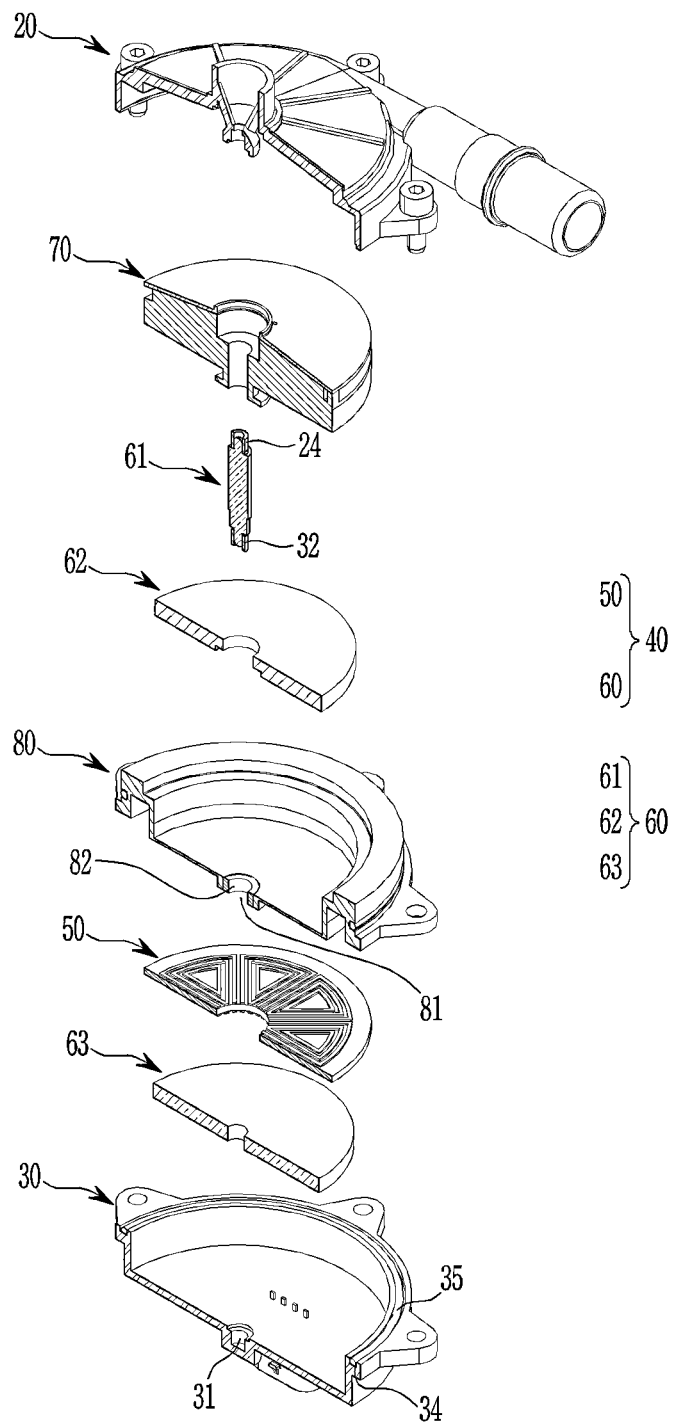
FIG. 8 is an exploded perspective view illustrating a configuration of an electric water pump according to another embodiment.

As illustrated in FIGS. 7 and 8, the electric water pump according to another embodiment may include a housing 10, an impeller 70 provided inside the housing 10, a waterproof cover 80 partitioning the inside of the housing 10, and a driving motor 40 including a rotor assembly 60 and a stator assembly 50.

The waterproof cover 80 is provided between the upper housing 20 and the lower housing 30. The waterproof cover 80 partitions an internal space between the upper housing 20 and the lower housing 30 into a wet area 11 and a dry area 12.

Figure 9:
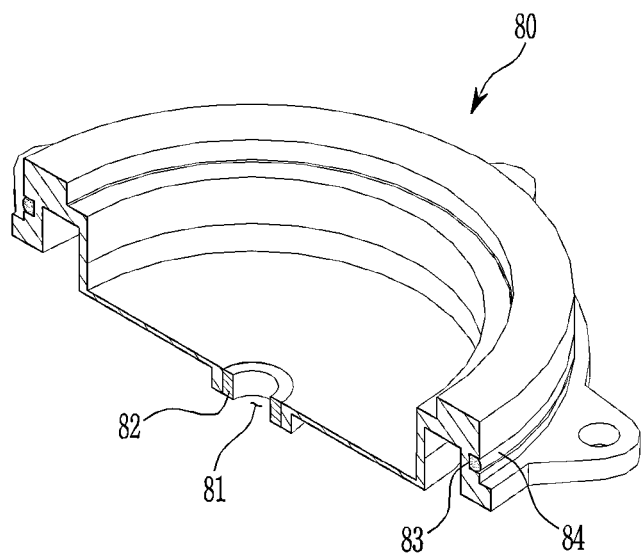
FIG. 9 is a perspective view illustrating a configuration of a water cover of an electric water pump according to another embodiment.

Referring to FIG. 9, the waterproof cover 80 is formed or provided to have an approximately hollow cylindrical shape and an upper portion of the waterproof cover 80 is opened. A center hole 81 is formed at a center of the waterproof cover 80 and an intermediate bearing 82 is provided in the center hole 81. A second sealing groove 83 is formed or disposed on a radial outer facing surface of the waterproof cover 80 in a circumferential direction and an intermediate sealing member 84 is provided in the second sealing groove 83.

Referring back to FIGS. 7 and 8, when the upper housing 20 and the waterproof cover 80 are coupled or joined, the intermediate sealing member 84 provided on the radial outer facing surface of the waterproof cover 80 may prevent cooling water from leaking to the outside of the housing 10. In addition, when the waterproof cover 80 and the lower housing 30 are coupled or joined, a gap between the waterproof cover 80 and the lower housing 30 is sealed.

Figure 10:
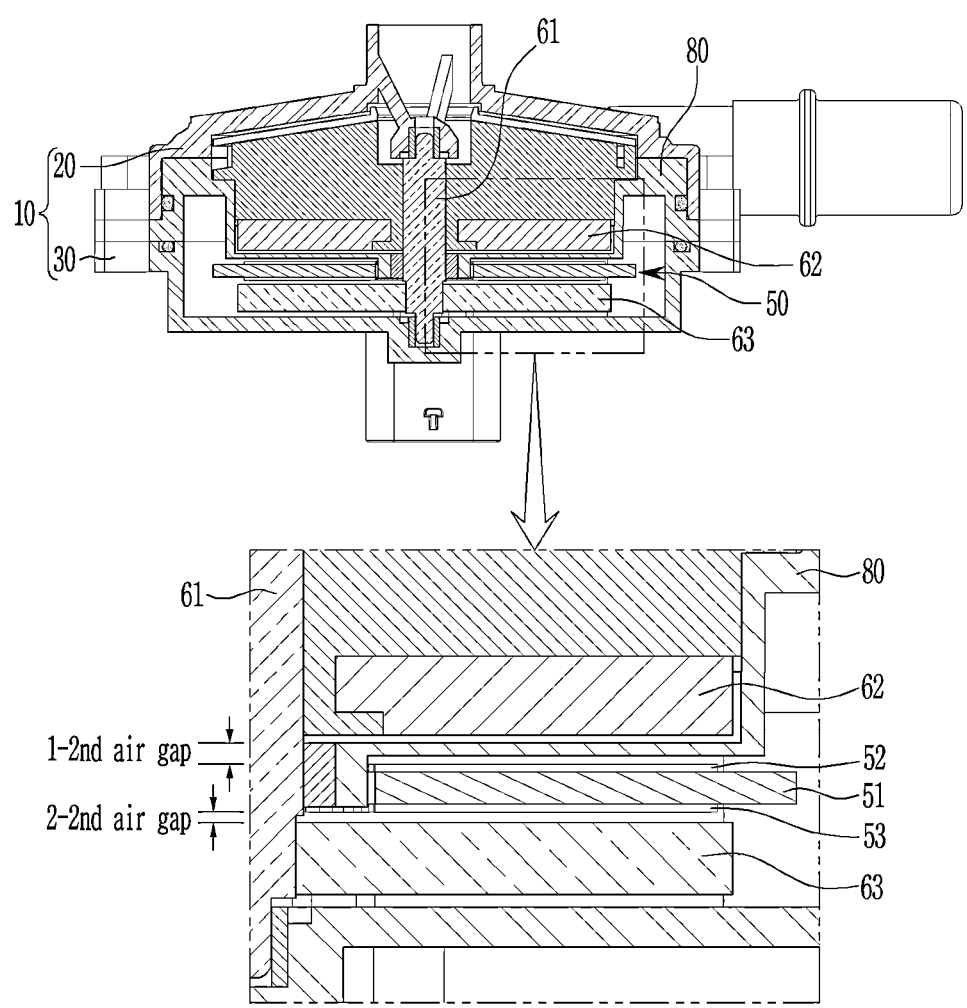
FIG. 10 is a cross-sectional view illustrating a configuration of an electric water pump according to another embodiment.

Referring to FIGS. 7 and 10, the wet area 11 partitioned by the waterproof cover 80 is positioned at the upper portion of the housing 10 and the dry area 12 is positioned at the lower portion of the housing 10. In another embodiment, the impeller 70, the first magnetic body 62, the waterproof cover 80, the stator assembly 50, and the second magnetic body 63 are sequentially disposed in an internal space of the housing 10 in the upper and lower directions. As a result, the impeller 70 and the first magnetic body 62 are positioned in the wet area 11 and the stator assembly 50 and the second magnetic body 63 are positioned in the dry area 12.

The upper surface of the stator assembly 50 and the lower surface of the first magnetic body 62 are spaced apart from each other at a predetermined interval to form a $1\text{-}2^{nd}$ air gap. The lower surface of the stator assembly 50 and the upper surface of the second magnetic body 63 are spaced apart from each other at a predetermined interval to form a $2\text{-}2^{nd}$ air gap. Since the waterproof cover 80 is interposed between the stator assembly 50 and the first magnetic body 62, the $1\text{-}2^{nd}$ air gap of the electric water pump in FIGS. 7-10 may be relatively larger than the $1\text{-}1^{st}$ air gap of the electric water pump described with reference to FIGS. 1-6.

Although embodiments of the present disclosure have been described hereinabove, the present disclosure is not limited thereto. Various modifications can be made within the scope of the claims, the detailed description of the present disclosure, and the accompanying drawings, and are within the scope of the present disclosure.

DESCRIPTION OF SYMBOLS

10: Housing
11: Wet area
12: Dry area
20: Upper housing
21: Cooling water inlet
22: Cooling water outlet
23: Upper bearing support
24: Upper bearing
25: Support rod
26: Support boss
30: Lower housing
31: Lower bearing support
32: Lower bearing
34: First sealing groove
35: Lower sealing member
40: Driving motor
50: Stator assembly
51: Stator body
52: Upper stator coil
53: Lower stator coil
60: Rotor assembly
61: Rotary shaft
62: First magnetic body
63: Second magnetic body
70: Impeller
80: Waterproof cover
81: Center hole
82: Intermediate bearing
83: Second sealing groove
84: Intermediate sealing member

What is claimed is:

1. An electric water pump comprising:
a housing having a cooling water inlet formed at an upper portion and a cooling water outlet formed on a side of the housing;
a waterproof cover partitioning an inside of the housing into a wet area and a dry area;
a stator assembly provided inside the housing, the stator assembly having stator coils on upper and lower surfaces thereof, respectively;
a rotor assembly including a first magnetic body provided to correspond to the upper surface of the stator assembly, a second magnetic body provided to correspond to the lower surface of the stator assembly, and a rotary shaft rotatably supported on the housing; and
an impeller provided to rotate integrally with the rotary shaft of the rotor assembly,
wherein the wet area is disposed at an upper portion of the inside of the housing,
wherein the dry area is disposed at a lower portion of the inside of the housing,
wherein the impeller and the first magnetic body are positioned in the wet area, and
wherein the stator assembly and the second magnetic body are positioned in the dry area.

2. The electric water pump of claim 1, wherein the housing includes an upper housing and a lower housing provided below the upper housing.

3. The electric water pump of claim 2, wherein:
the cooling water inlet is formed at an upper center of the upper housing; and
the cooling water outlet is formed on a side of the upper housing.

4. The electric water pump of claim 2, wherein the rotary shaft is rotatably provided in the upper housing, the waterproof cover, and the lower housing.

5. The electric water pump of claim 4, further comprising:
an upper bearing provided in an upper bearing support disposed below the cooling water inlet of the upper housing;
an intermediate bearing provided at a center hole disposed in the waterproof cover; and
a lower bearing provided in a lower bearing support disposed at a lower center of the lower housing,
wherein the rotary shaft is rotatably supported through the upper bearing, the intermediate bearing, and the lower bearing.

\* \* \* \* \*